United States Patent Office 3,714,151
Patented Jan. 30, 1973

3,714,151
MONO- AND DIPHTHALIMIDO DERIVATIVES AND THEIR USE IN DETERGENT AND BLEACH COMPOSITIONS
Warren I. Lyness, Mount Healthy, Ohio, assignor to The Procter & Gamble Company, Cincinnati, Ohio
No Drawing. Filed Nov. 2, 1967, Ser. No. 680,005
Int. Cl. C07d 27/52
U.S. Cl. 260—240 CA
4 Claims

ABSTRACT OF THE DISCLOSURE

The provision of mono- and diphthalimido derivatives of fluorescent, aromatic amines and their use in (1) laundry detergent compositions which contain an organic detergent and an alkaline builder salt and (2) in aqueous and granular hypochlorite bleach compositions.

BACKGROUND

This invention relates to optical brightening agents. More particularly, it relates to optical brightening agents for use in laundry detergent formulations containing an organic detergent active and an alkaline builder salt and for use in aqueous and granular bleach compositions.

In recent years, the use of optical brightening agents, oftentimes termed optical bleaches or fluorescers, has grown enormously. These compositions which are colorless dyestuffs exhibiting substantivity to fabrics function by absorbing light in the ultraviolet invisible range (300–400 nm.) such as is contained in natural daylight and remitting this as visible, blue-white light (400–500 nm.). This fluorescence masks the natural yellowing of textile fibers and results in a highly desirable blue-white "glow" on white goods and a fresher, cleaner appearance of colored goods. The fluorescence of optical brightening agents, while in the blue range, varies somewhat in dominant wavelength. Where the dominant wave length is longer, the blue fluorescence is considered to have a slightly greenish tinge. A shorter dominant wavelength near the violet end of the spectrum results in blue fluorescence which is slightly reddish. For practical purposes, particularly for use in laundry detergent formulations, a neutral blue fluorescence is generally preferable.

Optical brighteners suitable for laundry application must have fabric substantivity, alkaline stability, water solubility and a high degree of fluorescence. In addition, it is particularly advantageous if an optical brightener is resistant to the destructive effects of hypochlorite bleaches. Hypochlorite and similar oxidizing bleaches are generally known to decompose or quench the fluorescent properties of conventional optical brighteners employed in detergent compositions. Since many of the deeply embedded soils and stains encountered in the laundering of textile fabrics may be efficiently removed only by the action of chemical bleaching, the use of chemical bleaching, as a practical matter, may not be eliminated. Consequently, a great effort has been expended in the search for optical brighteners which are compatible with hypochlorite bleach and which are susceptible of use in laundering operations where contact with hypochlorite bleaches is encountered.

Accordingly, it is an object of this invention to provide optical brighteners having fabric substantivity, alkaline stability, water solubility and a high degree of fluorescence.

Another object of this invention is to provide optical brighteners compatible with and resistant to the destructive effects of hypochlorite bleaches.

A further object of this invention is to provide laundry detergent compositions containing an organic detergent, an alkaline builder salt and an optical brightener.

Still another object of this invention is to provide laundry detergent compositions containing an organic detergent, an alkaline builder salt, a hypochlorite bleach and an optical brightener.

Still another object of this invention is to provide aqueous and granular hypochlorite bleach compositions containing an optical brightener.

Other objects of this invention will become apparent from consideration of the detailed description of the invention which appears hereinafter.

SUMMARY OF THE INVENTION

The above and other objects of this invention are achieved in accordance with the present invention which comprises the provision of mono- and diisoindolyl optical brightener derivatives of the formula:

$$\left[ A_a - \underset{\phantom{X}}{\text{phthalimido}} - N - \right]_x Z$$

wherein each $a$ is an integer from 1 to 4; $x$ is an integer 1 or 2; each A is hydrogen; alkyl of 1 to about 10 carbon atoms (e.g., methyl, ethyl, propyl, butyl, octyl, decyl), preferably of 1 to 4 carbon atoms; halogen (e.g., chlorine, bromine); alkoxy of 1 to about 10 carbon atoms (e.g., methoxy, butoxy, hexoxy, decoxy); aryl of from 6 to about 12 carbon atoms (e.g., phenyl, biphenyl, naphthyl); alkylsulfonyl of from about 1 to 10 carbon atoms (e.g., methylsulfonyl, octylsulfonyl, decylsulfonyl); alkoxyalkyl of from 2 to about 10 carbon atoms (e.g., methoxymethyl, butoxymethyl, ethylhexyloxymethyl); polyethylenoxys of the formula $H(CH_2CH_2O)_n-$ where $n$ is an integer from 1 to 10 (e.g., $CH_3CH_2O(CH_2CH_2O)_3-$) or haloalkyl of from about 1 to 10 carbon atoms (e.g., trifluoromethyl, perfluoroethyl, dichloroethyl); alkanoyl of from 1 to about 10 carbon atoms (e.g., hexanoyl, octanoyl); cyano; polyhydroxyalkyl of 1 to about 10 carbon atoms (e.g., 1,2,3-trihydroxypropyl); and Z is, when $x$ is one, a monovalent radical derived by abstraction of a primary amino group of a fluorescent aromatic mono- or diamine characterized by ultraviolet obsorption in the 325 to 400 nanometer (nm.) range and fluorescence in the 400 to 475 nm. range; and, when $x$ is two, a bivalent radical derived by abstraction of two primary amino groups from a fluorescent aromatic diamine having the aforedescribed absorption and fluorescence spectral characteristics.

The compounds which may be prepared according to the present invention are excellent optical brighteners for use in laundry detergents containing alkaline builder materials and are especially characterized by their resistance to the destructive action of chlorine-containing bleaching compounds. Accordingly, they may be employed in detergent compositions containing alkaline builder compounds and active chlorine-containing bleaching compounds and in aqueous and granular bleach compositions.

DETAILED DESCRIPTION OF THE INVENTION

The mono- and diphthalimido derivatives of the present invention having the formula $$\left[ A_a - \underset{\phantom{X}}{\text{phthalimido}} - N - \right]_x Z$$

wherein A, Z, $a$ and $x$ have the hereinbefore described definitions are characterized as mono- and diphthalimido derivatives depending upon the value of $x$. When $x$ is one in the generic formula, monophthalimido compounds are contemplated whereas diphthalimido compounds are contemplated when x is two.

The monophthalimido optical brighteners of the present invention are derived from fluorescent, aromatic, primary mono- or di-amines characterized by ultraviolet absorption in the 325 to 400 nanometer range and fluorescence in the 400 to 475 range. These fluorescent amines may be represented by the formulas $H_2N-Z$ and $H_2N-Z-NH_2$, wherein Z in the first instance represents the residue of a fluorescent aromatic monoamine, i.e., the entire molecule exclusive of the amino group; and in the second instance represents a fluorescent aromatic diamine exclusive of the amino groups.

The formation of a monophthalimide derivative by condensation with a phthalic acid anhydride may be illustrated by the following reaction scheme

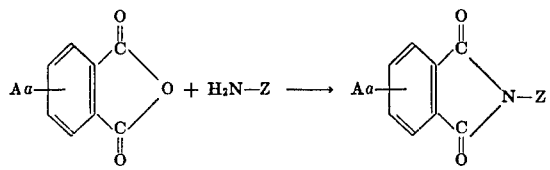

wherein A, a and Z have the definitions hereinbefore described.

Similarly, a monophthalimido derivative may be prepared by reacting one amino group of a fluorescent, aromatic diamine with an amount of anhydride which is about half that required to react with both amino groups. This reaction may be illustrated as follows:

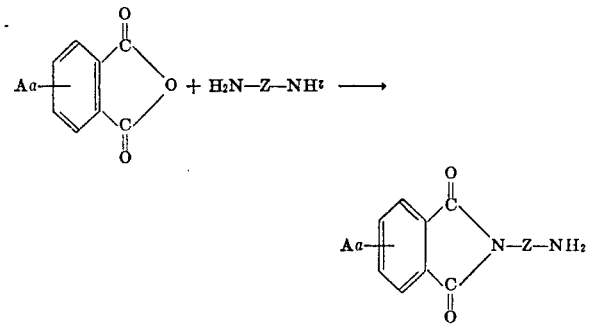

Compounds prepared in accordance with the latter scheme while exhibiting substantive whitening properties are generally not as bleach compatible as those compounds which are characterized by the formation of phthalimido groups from both amino groups of a fluorescent, aromatic diamine. This reaction is illustrated as follows:

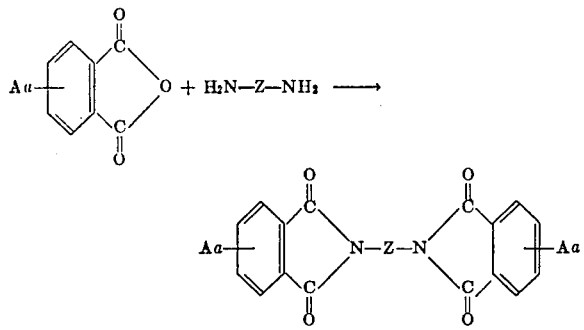

The phthalic acid derivatives which may be employed to effect the formation of phthalimido groups from amino groups of fluorescent, aromatic amines include those which are commonly employed in the preparation of imides. Generally, they may be designated as follows:

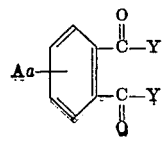

wherein A and a have the meanings aforedescribed and each Y represents hydroxy (—OH); halogen (—Cl); amido (—NH$_2$); lower alkyl (e.g., methyl) or when taken together, a single oxygen atom, in which case a phthalic anhydride is contemplated.

The amines which may be employed to prepare the optical brighteners of the present invention are any of those fluorescent aromatic primary mono- and diamines characterized by ultraviolet absorption in the range of 325 to 400 nm. and fluorescence in the 400–475 nm. range. These compounds are conventional brightener chromophores known to those skilled in the art. Examples of fluorescent amines having the prescribed spectral characteristics and their monovalent or bivalent radicals (Z) derived by abstraction of one or more amino groups include the following preferred structures:

(1) 7-aminocoumarins of the formula:

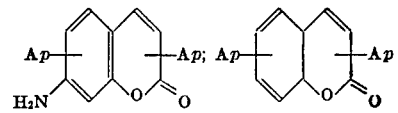

wherein each p is 1 or 2 and each A is as hereinbefore defined;

(2) 5-amino - 1,8 - naphthalenecarboximides of the formula:

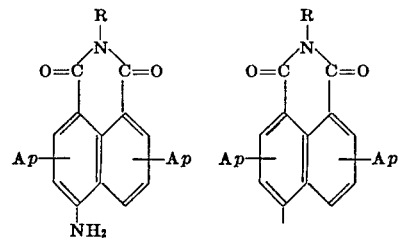

where each p and A is defined as above; and R is hydrogen alkyl of 1 to 4 carbon atoms; or aryl of 6 to about 12 carbon atoms.

(3) 4-aminostilbenes of the formula:

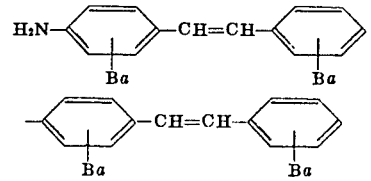

where each a is as defined above and each B is defined as A above or —SO$_2$OM or

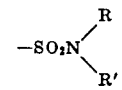

where M is hydrogen or an alkali metal (e.g., sodium, potassium, lithium); and R and R' are each hydrogen or alkyl of 1 to about 4 carbon atoms; or part of a ring structure (e.g., morpholine)

(4) 4,4'-diaminostilbenes of the formula

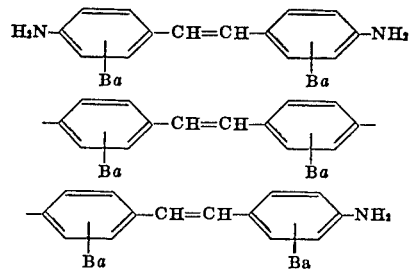

where each a is as defined above and each B is defined the same as A above or —SO$_2$OM or

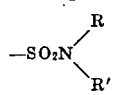

where M is hydrogen or an alkali metal (e.g., sodium, potassium, lithium); and R and R' are defined as above:

(5) 2-aminonaphthalenes of the formula:

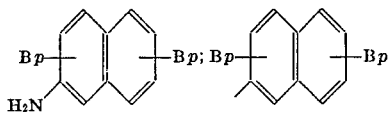

where each p is defined as above and each B is the same as A defined above or —SO$_2$OM or

where M is hydrogen or an alkali metal (e.g., sodium, potassium, lithium); and R and R' are defined as above;

(6) 3-amino-2,5-diaryl heterocylics of the formula

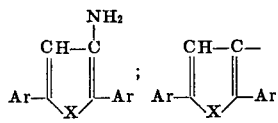

where X is O or NCH$_3$; Ar is phenyl, naphthyl sulfonate or phenyl having a substituent at the meta, para or both meta and para positions selected from the group consisting of chlorine, methoxy, sulfonate and dialkylamino wherein each alkyl has from 1 to about 4 carbon atoms.

Especially preferred amines for reasons of facility in undergoing the desired reaction with phthalic acid derivatives are the 3-amino-2,5-diarylfurans

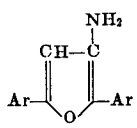

wherein Ar has the above described definition (e.g., 3-amino-2,5-diphenylfuran); the 7-aminocoumarins (e.g., 4-methyl-6-methoxycoumarin); the aminostilbenes (e.g., 4-amino-4'-methoxy-2,2'-disulfonic acid,

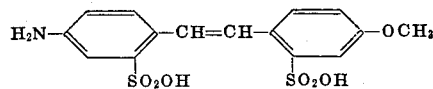

the disodium salt thereof, 4-amino-4'-methoxystilbene-2,2'-disulfonamide,

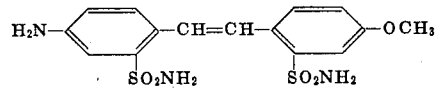

4,4'-diaminostilbene-2,2'-disulfonic acid,

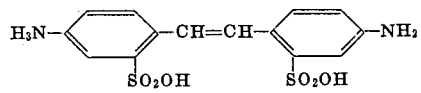

the disodium salt thereof and 4,4'-diaminostilbene-2,2'-disulfonamide).

It will be understood, of course, that the specific amine chromophores described above are described by way of example only and are not intended as limiting the scope of the invention as defined in the appended claims. Inasmuch as the precise nature of the fluorescent amine employed during reaction is believed to be secondary to the presence of the essential phthalimido moiety

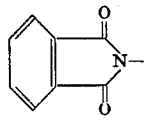

which is at least in part believed to be responsible for the remarkable bleach compatibility and resistance of the presently claimed optical brightening agents, the selection of suitable fluorescent aromatic amines characterized by ultraviolet absorption in the 325 to 400 range and fluorescence in the 400 to 475 range is not believed to be a critical aspect of the present invention.

Optical brighteners derived from the preferred amines of the present invention have the following structures:

(1)

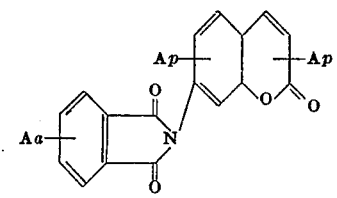

(2)

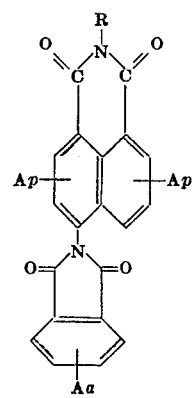

(3)

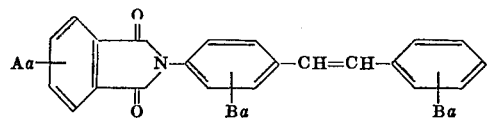

(4)

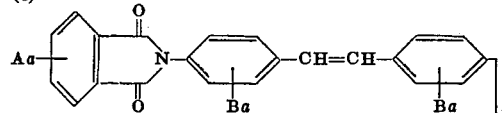

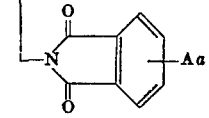

(5)

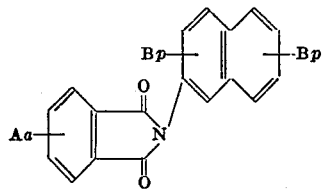

and (6)

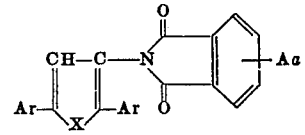

wherein a, p, A, B, Ar, X, and R have the meanings defined above.

Optical brighteners prepared from the especially preferred amines have the structures:

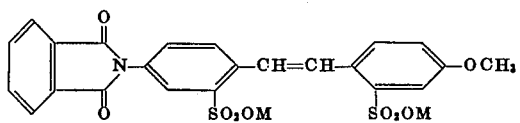

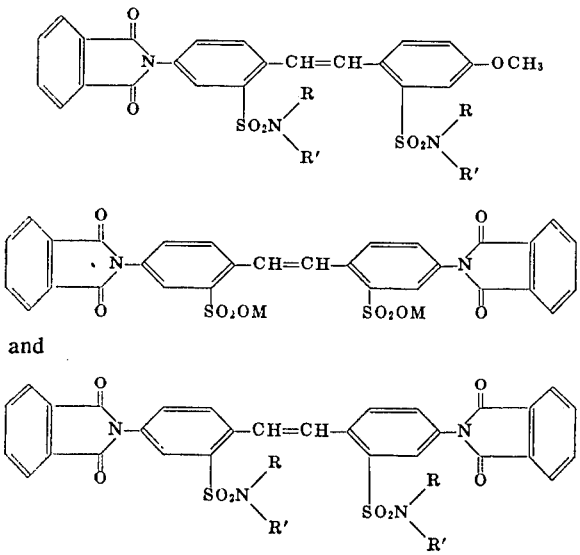

and

The present invention is not intended to be limited by any particular process of preparing the instantly claimed mono- and diphthalimido derivatives. It is, however, an advantage of the present invention that the derivatives may be simply and efficiently prepared in good yields. Any of the processes commonly employed to effect the preparation of imides from primary amines may be employed including those wherein the reactive phthalic acid derivative employed is a phthalic acid, anhydride, diamide, a lower alkyl ester of phthalic acid or a phthaloyl halide. Examples of suitable methods of effecting the preparation of imides from diacids and anhydrides are disclosed by Paris, Berlinguet and Gaudry, Organic Syntheses, Collective Volume 4, p. 498; Fiest and Schultz, Arch. Pharm. 272, 789 (1934); and Cornfield, Jones and Park, J.A.C.S. 71, 158 (1949).

A preferred method involving reaction of an amine with an anhydride to form an intermediary amide followed by dehydration in the presence of acetic anhydride, pyridine and benzene to an imide is disclosed by Sroog, Journal of Polymer Science: Part C, 16 1191 (1967). This latter method results in the attainment of good yields and is described in the examples which hereinafter describe the preparation of phthalimido derivatives of the present invention.

Specific examples of the brightener compounds employed in the laundry detergent composition of this invention are the following:

(1) 3-phenyl-7-phthalimidocoumarin
(2) 2-(p-chlorophenyl)-7-phthalimidocoumarin
(3) 3-phenyl-7-(2-methylphthalimido)coumarin
(4) 3-phenyl-5-methoxy-7-phthalimidocoumarin
(5) 3(p-phenylsulfonic acid)-7-phthalimidocoumarin
(6) N-methyl-5-phthalimido-1,8-naphthalene carboxamide
(7) 4-phthalimido-4'-methylstilbene
(8) 4-phthalimido-4'-methoxystilbene
(9) sodium 4-phthalimido-4'-stilbenesulfonic acid
(10) 4-phthalimido-4'-phenylstilbene
(11) 4-phthalimido-3 methoxy-4'-methylstilbene
(12) 4-(2-chlorophthalimido)-4'-(2-methylphthalimido-stilbenedisulfonic acid
(13) disodium 4,4'-diphthalimido-2,2'-stilbenedisulfonate
(14) 4,4'-diphthalimido-2,2'-stilbenedisulfonamide
(15) 4-phthalimido-4'-(2-chlorophthalimido)-2,2'-stilbenedisulfonamide
(16) disodium 4,4'-diphthalimido-6,6'-dichloro,-2,2'-stilbenedisulfonate
(17) sodium 6-phthalimido-2-naphthalenesulfonate
(18) 6-phthalimido-2-naphthalenesulfonamide
(19) sodium 4-chloro-6-phthalimido-2-naphthalenesulfonate
(20) 2,5-diphenyl-3-phthalimido-furan
(21) disodium 2,5-(p-phenylsulfonate)-3-phthalimido-furan
(22) 2,5-di(p-chlorophenyl)-3-phthalimidofuran
(23) 2-(p-methoxyphenyl)-3-phthalimido-5-(p-chlorophenyl)-furan
(24) N-methyl-2,5-diphenyl-3-phthalimidopyrrole
(25) 2,5-di-(m-methoxyphenyl)-3-phthalimidofuran The brightener compounds of the present invention are alkali-stable and have a high degree of fluorescence and substantivity to cellulosic, nylon and acetate fabrics, particularly with respect to cotton fabrics. The water solubility of these brightener compounds is also satisfactory.

These brightener compounds are employed at a level ranging from about 0.01% to about 1% of the laundry detergent composition. In addition to these brightener compounds, the laundry detergent compositions of this invention comprise at least about 10% of a mixture of an organic detergent and an alkaline builder salt in a ratio in the range of about 5:1 to about 1:20, preferably about 2:1 to about 1:10. This mixture cane be as much as the balance of the composition. The organic detergent compounds and alkaline builder salts are more fully described below.

Organic detergents

The organic detergent compounds which can be utilized in the detergent compositions of this invention are the following:

(a) Water-soluble soaps.—Examples of suitable soaps for use in this invention are the sodium, potassium, ammonium and alkanolammonium (e.g., mono-, di-, and triethanolammonium) salts of higher fatty acid ($C_{10}$–$C_{22}$). Particularly useful are the sodium and potassium salts of the mixtures of fatty acids derived from cocconut oil and tallow, i.e., sodium and potassium tallow and coconut soaps.

(b) Anionic synthetic non-soap detergents.—A preferred class can be broadly described as the water-soluble salts, particularly the alkali metal salts, of organic, sulfuric acid reaction products having in their molecular structure an alkyl radical containing from about 8 to about 22 carbon atoms and a radical selected from the group consisting of sulfonic acid and sulfuric acid ester radicals (Included in the term alkyl is the alkyl portion of higher acyl radicals.) Important examples of these anionic synthetic detergents are the sodium or potassium alkyl sulfates, especially those obtained by sulfating the higher alcohols ($C_8$–$C_{18}$ carbon atoms) produced by reducing the glycerides of tallow or coconut oil; sodium or potassium alkyl benzene sulfonates, in which the alkyl group can be a straight or branched chain and contains from about 9 to about 15 carbon atoms, preferably about 12–14 carbons; sodium alkyl glyceryl ether sulfonates, especially those ethers of the higher alcohols derived from tallow and coconut oil; sodium coconut oil fatty acid monoglyceride sulfates and sulfonates; sodium or potassium salts of sulfuric acid esters of the reaction product of one mole of a higher fatty alcohol (e.g., tallow or coconut oil alcohols) and about 1 to 6 moles of ethylene oxide; sodium or potassium alkyl phenol ethylene oxide ether sulfates, with 1 to 10 units of ethylene oxide per molecule and wherein the alkyl radicals contain from 8 to 12 carbon atoms; the reaction product of fatty acids esterified with isethionic acid and neutralized with sodium hydroxide where, for example, the fatty acids are derived from coconut oil; sodium or potassium salts of fatty acid amide of a methyl tauride in which the fatty acids, for example, are derived from coconut oil; sodium and potassium salts of $SO_3$-sulfonated $C_{10}$–$C_{24}$ α-olefins.

(c) Nonionic synthetic detergents.—One class of nonionic detergents can be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements. A second class of nonionic detergents comprises higher fatty amides. A third class of nonionic detergents has semi-polar characteristics. These three classes can be defined in further detail as follows:

(1) One class of nonionic synthetic detergents is marketed under the trade name of "Pluronic." These detergent compounds are formed by condensing ethylene oxide with a hydrophobic base formed by the condensation of proportion of the molecule which, of course, exhibits water insolubility, has a molecular weight of from about 1500 to 1800. The addition of polyoxyethylene radicals to this hydrophobic portion tends to increase the water solubility of the molecule as a whole and the liquid character of the product is retained up to the point where the polyethylene content is about 50% of the total weight of the condensation product.

(2) Alkylphenol-polyethylene oxide condensates are condensation products of alkyl phenols having an alkyl group containing from about 6 to 12 carbon atoms in either a straight chain or branched chain configuration with ethylene oxide, the said ethylene oxide being present in amounts equal to 5 to 25 moles of ethylene oxide per mole of alkyl phenol. The alkyl substituent in such compounds may be derived from polymerized propylene, diisobutylene, octene, or nonene, for example.

(3) Nonionic synthetic detergents can be derived from the condensation of ethylene oxide with the product resulting from the reaction of propylene oxide and ethylene diamine and include compounds containing from about 40% to about 80% polyoxyethylene by weight and having a molecular weight of from about 5,000 to about 11,000. Such compounds result from the reaction of ethylene oxide with a hydrophobic base constituted of the reaction product of ethylene diamine and excess propylene oxide, said base having a molecular weight of the order of 2,500 to 3,000.

(4) Other nonionic detergents include condensation products of aliphatic alcohols having from 8 to 22 carbon atoms, in either straight chain or branched chain configuration, with ethylene oxide, e.g., a coconut alcohol-ethylene oxide condensate having from 5 to 30 moles of ethylene oxide per mole of coconut alcohol.

(5) The ammonia, monoethanol and diethanol amides of fatty acids having an acyl moiety of from about 8 to about 18 carbon atoms are useful nonionic detergents. These acyl moieties are normally derived from naturally occurring glycerides, e.g., coconut oil, palm oil, soybean oil and tallow, but can be derived synthetically, e.g., by the oxidation of petroleum, or by hydrogenation of carbon monoxide by the Fischer-Tropsch process.

(6) Semi-polar nonionic detergents include long chain tertiary amine oxides corresponding to the following general formula

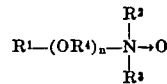

wherein $R^1$ is an alkyl radical of from about 8 to about 18 carbon atoms, $R^2$ and $R^3$ are each methyl, ethyl or hydroxyethyl radicals, $R^4$ is ethylene, and $n$ ranges from 0 to about 10. The arrow in the formula is a conventional representation of a semi-polar bond. Specific examples of amine oxide detergents include dimethyldodecylamine oxide and bis-(2-hydroxyethyl) dodecylamine oxide.

(7) Other semi-polar nonionic detergents include long chain tertiary phosphine oxides corresponding to the following general formula $RR'R''P \to O$ wherein R is an alkyl, alkenyl or monohydroxyalkyl radical containing from 10 to 20 carbon atoms and R' and R'' are each alkyl or monohydroxyalkyl groups containing from 1 to 3 carbon atoms. The arrow in the formula is a conventional representation of a semi-polar bond. Examples of suitable phosphine oxides are found in U.S. Pat. 3,304,263 which issued Feb. 14, 1967, and include: dimethyldodecylphosphine oxide and dimethyl-(2-hydroxydodecyl) phosphine oxide.

(8) Still other semi-polar nonionic synthetic detergents include long chain sulfoxides having the formula

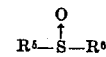

wherein $R^5$ is an alkyl radical containing from about 10 to about 28 carbon atoms, from 0 to about 5 ether linkages and from 0 to about 2 hydroxyl substituents, at least one moiety of $R^5$ being an alkyl radical containing 0 ether linkages and containing from about 10 to about 18 carbon atoms, and wherein $R^6$ is an alkyl radical containing from 1 to 3 carbon atoms and from one to two hydroxyl groups. Specific examples of these sulfoxides are: dodecyl methyl sulfoxide and 3-hydroxyl tridecyl methyl sulfoxide.

(d) Ampholytic synthetic detergents can be broadly described as derivatives of aliphatic secondary and tertiary amines, in which the aliphatic radical can be straight chain or branched alkyls and wherein one of the aliphatic substituents contains from about 8 to 18 carbon atoms and one contains an anionic water solubilizing group, e.g., carboxy, sulfo, sulfato, phosphato, or phosphono. Examples of compounds falling within this definition are sodium-3-dodecylaminopropionate and sodium-3-dodecylaminopropane sulfonate.

(e) Zwitterionic synthetic detergents can be broadly described as derivatives of aliphatic quaternary ammonium, phosphonium and sulfonium compounds, in which the aliphatic radical can be straight chain or branched alkyl, and wherein one of the aliphatic substituents contains from about 8 to 24 carbon atoms and one contains an anionic water solubilizing group, e.g., carboxy, sulfo, sulfato, phosphato or phosphono. Examples of compounds falling within this definition are 3-(N,N-dimethyl-N-hexadecylammonio) propane-1-sulfonate and 3-(N,N-dimethyl-N-hexadecylammonio)-2-hydroxy propane-1-sulfonate which are preferred for their cool water detergency characteristics. See, for example, Snoddy et al., Canadian Pat. 708,148.

These soap and non-soap anionic, nonionic, ampholytic and zwitterionic detergent compounds can be used singly or in combination. The above examples are merely illustrations of the numerous suitable detergents. Other organic detergent compounds can also be used.

Builder salts

The detergent compositions of this invention also contain water-soluble, builder salts either of the organic or inorganic types.

Examples of suitable water-soluble, inorganic alkaline detergency builder salts are alkali metal carbonates, borates, phosphates, polyphosphates, bicarbonates, silicates and sulfates. Specific examples of such salts are sodium and potassium tetraborates, perborates, bicarbonates, carbonates, tripolyphosphates, pyrophosphates, orthophosphates and hexametaphosphates.

Examples of suitable organic alkaline detergency builder salts are: (1) Water-soluble aminopolyacetates, e.g., sodium and potassium ethylenediaminetetraacetates, nitrilotriacetates and N-(2-hydroxyethyl)-nitrilo diacetates; (2) Water-soluble salts of phytic acid, e.g., sodium and potassium phytates—see U.S. Pat. 2,739,942; (3) Water-soluble polyphosphonates, including specifically, sodium, potassium and lithium salts of ethane-1-hydroxy-1,1-diphosphonic acid, sodium, potassium and lithium salts of methylene diphosphonic acid, sodium, potassium and lithium salts of ethylene diphosphonic acid, and sodium, potassium and lithium salts of ethane-1,1,2-triphosphonic acid. Other examples include these alkali metal salts of ethane-2-carboxy-1, 1-diphosphonic acid, hydroxymethanediphosphonic acid, carbonyldiphosphonic acid, ethane-1-hydroxy-1,1,2-triphosphonic acid, ethane-2-hydroxy-1,1,2-triphosphonic acid, propane-1,1,3,3-tetraphosphonic acid, propane-1,1,2,3-tetraphosphonic acid, and propane-1,2,2,3-tetraphosphonic acid; (4) Water-soluble salts of polycarboxylate polymers and copolymers as described in the patent of Francis L. Diehl, U.S. 3,308,067 issued Mar. 7, 1967. Specifically, a detergent builder material comprising a water-soluble salt of a polymeric aliphatic polycarboxylic acid having the following structural relationships as to the position of the carboxylate groups and possessing the following prescribed physical characteristics: (a) a minimum molecular weight of about 350 calculated as to the acid form; (b) an equivalent weight of about 50 to about 80 calculated as to acid form; (c) at least 45 mole percent of the monomeric species having at least two carboxyl radicals separated from each other by not more than two carbon atoms; (d) the site of attachment to the polymer chain of any carboxy-containing radical being separated by not more than three carbon atoms along the polymer chain from the site of attachment of the next carboxyl-containing radical. Specific examples are polymers of itaconic acid, aconitic acid, maleic acid, mesaconic acid, fumaric acid, methylene malonic acid, and citraconic acid and copolymers with themselves and other compatible monomers such as ethylene.

Mixtures of organic and/or inorganic builders can be used and are generally desirable. One such mixture of builders is disclosed in Canadian Pat. 755,038 of Burton H. Gedge, e.g., ternary mixtures of sodium tripolyphosphate, trisodium nitrilotriacetate and trisodium ethane-1-hydroxy-1,1-diphosphonate. The above described builders can also be utilized singly in this invention.

The preferred builders are sodium tripolyphosphate and sodium nitrilotriacetate, alone or in admixture. The preferred organic detergents are the anionic sulfate and sulfonates. The detergent compositions preferably provide pH's in the range of about 8.5 to about 11.5.

The laundry detergent compositions of this invention can contain, if desired, in addition to the brightener, organic detergent and builder, any of the usual additives for such compositions which make them more attractive or effective. For example, perfumes, dyes, proteolytic enzymes, corrosion inhibitors, oxygen and chlorine bleaches, soil redeposition agents and other brighteners can be used. Diluents such as water, moisture and sodium sulfate can also be used to make up any balance of a composition comprising brightener, organic detergent and alkaline builder salt.

The mono- and diphthalimido optical brighteners of the present invention are stable to attack by hypochlorite compounds. Thus this stable class of brighteners is advantageously employed in laundry detergent compositions which contain from about 0.5% to about 25%, usually 3-17%, of an active-chlorine containing bleaching compound. Examples of such compounds are: dichlorocyanuric acid; 1,3-dichloro-5,5-dimethyl hydantoin; N,N, dichlorobenzoylene urea; paratoluene sulfondichloroamide; trichloromelamine; N - chloroammeline; N - chlorosuccinimide; N,N' - dichloroazodicarbonamide; N - chloroacetyl urea; N,N' dichlorobiuret; chlorinated dicyandiamide; sodium hypochlorite; calcium hypochlorite; lithium hypochlorite; chlorinated trisodium phosphate. Preferred compounds are dichlorocyanurates, i.e. dichlorocyanuric acid and the sodium and potassium salts thereof.

In other embodiments of the present invention the mono- and diphthalimido optical brighteners are employed in aqueous and granular bleach compositions. In general, aqueous bleach compositions are prepared by dissolving or dispersing an optical brightener in an aqueous solution of alkali metal hypochlorite bleach. The optical brighteners of the present invention are readily soluble in aqueous hypochlorite solution and remain stable over an extended period of time so that they may be successfully packaged, shipped and stored without rendering ineffective the whitening action of the optical brightener or the oxidizing action of the bleach. Liquid bleach compositions prepared in accordance with the present invention are characterized by a pH ranging from about 10.5 to about 13.0 and consist essentially of from about 1.0% to about 10% alkali metal hypochlorite bleach and from about 0.002 to about 2% of the optical brightener.

Preferred hypochlorite bleach-containing compositions contain the alkali metal hypochlorite bleach component in amount of about 1 to 10%, preferably about 3% to 7%, with about 5.2% being especially preferred.

The bleach component can be any one of the alkali metal hypochlorites. Examples of such useful bleaches are sodium hypochlorite, potassium hypochlorite, lithium hypochlorite, and the like. However, sodium hypochlorite is highly preferred because of its superior properties and its ready availability.

The optical brighteners is present in the compositions of this invention in an amount ranging from 0.002% to about 2.0%, preferably from about 0.01% to about 0.1% with about 0.05% being especially preferred.

The bleach stable brighteners of the present invention are capable of retaining their whitening and brightening effects even after exposure to aqueous 1–10% hypochlorite-containing bleach solutions for extended periods of time, e.g., several weeks of storage. The bleach stability which is normally ascribed to conventional optical brighteners is commonly understood to mean that these optical brighteners are not ineffective when exposed to dilute solutions of bleach for limited periods of time, e.g., at washing conditions where the hypochlorite bleach is present in aqueous solutions at about 0.02% hypochlorite level for up to 20 to 30 minutes. In contradistinction to the bleach compatibility commonly understood in the art, the compatibility of the presently claimed optical brighteners is such that these brigheners retain their desirable effects after exposure to hypochlorite bleach concentrations not normally found in the course of the laundering process.

The desirable bleach compatibility of the optical brighteners of the present invention is employed to advantage in the use of these brighteners in solid hypochlorite bleach containing compositions. These compositions normally comprise about 1 to about 99% an active chlorine containing bleaching compound which is capable of evolving hypochlorite upon contact with water and from about 0.005 to 10% of the optical brightener of the present invention. Preferably the granular bleaching compositions of the present invention contain about 1 to 80% of the active chlorine-containing bleaching compound, about 2 to 25% of an organic surfactant detergent and about 5 to 60% of an alkaline builder salt, said bleach compounds, surfactants and builder salts being of the type hereinbefore described.

The granular-bleach compositions of this invention can contain, if desired, in addition to the bleaching compound, any of the usual additives for such compositions which make them more attractive or effective, for example, perfumes, dyes, proteolytic enzymes, corrosion inhibitors, other chlorine bleaches, soil redeposition agents and other brighteners may be used These granular bleach compositions have a pH ranging from about 8 to 12 and upon dissolution in water evolve active hypochlorite chlorine for the effective bleaching of cellulosic fabrics.

Preparations of exemplary optical brighteners of this invention are described as follows, with Roman numerals designating the compounds in Table I below.

EXAMPLE I

Preparation of disodium 4,4'-diphthalimido-2,2'-stilbenedisulfonate (I)

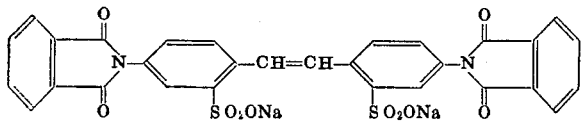

3.26 grams (.022 mole) of phthalic anhydride were added to a solution of 4.14 grams (0.1 moles) of disodium 4,4'-diamino-2,2'-stilbenedisulfonate dissolved in 1 liter of dimethyl formamide (DMF) and contained in a round-bottomed flask equipped with a reflux condenser, heating mantle, and magnetic stirring bar. After the resulting solution was heated at 70° C. for 4 hours, the DMF was removed by evaporation under reduced pressure and a light tan compound was obtained. The compound was ground into a fine powder and was added to a solution of 200 ml. of benzene, 100 ml. of acetic anhydride and 25 ml. of pyridine contained in a 1 liter round-bottomed flask equipped with a reflux condenser and a heating mantle. The mixture was allowed to reflux for 5 hours and the organic liquids were removed by evaporation under reduced pressure. A white solid, disodium 4,4'-phthalimido-2,2'-stilbenedisulfonate was crystallized from water (yield 5.61 grams). The infrared spectra demonstrated characteristic imide absorption at 1700 and 1750 cm.$^{-1}$. The ultraviolet absorption lambda max. was 442 nm.; the fluorescence lambda max. was 428 nm. NMR spectra were consistent with the imide structure.

*Analysis.*—Calcd. (percent): C, 49.9; H, 2.37; N, 4.16. Found (percent): C, 49.4; H, 2.17; N, 4.41.

Substantially similar results are obtained when the following compounds are substituted for phthalic anhydride in the above example:

4,5-dichloro-1,2-phthalic anhydride;
4-chloro-1,2-phthalic anhydride;
3-isopropoxy-1,2-phthalic anhydride;
4,5-diisopropyl-1,2-phthalic anhydride;
5-butoxy-1,2-phthalic anhydride;
3-trifluoromethyl-1,2-phthalic anhydride;
3-(1,4,7-trioxanonyl)-1,2-phthalic anhydride;
4-methoxymethyl-1,2-phthalic anhydride;
3-phenyl-1,2-phthalic anhydride;
3-naphthyl-1,2-phthalic anhydride;
3-methylsulfonyl-1,2-phthalic anhydride;
4-cyano-1,2-phthalic anhydride and
4-(1,2,3-trihydroxypropyl)-1,2-phthalic anhydride.

EXAMPLE II

Preparation of 4,4'-diphthalimido-2,2'-stilbenedisulfonamide (II)

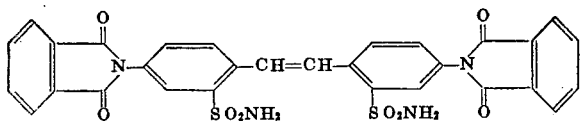

3.26 grams (.022 mole) of phthalic anhydride were added to a solution of 3.68 grams (.01 mole) of 4,4'-diamino 2,2'-stilbenedisulfonamide dissolved in 400 mls. of dimethyl formamide (DMF), and contained in a round bottomed actinic flask equipped with a reflux condenser, heating mantle, and magnetic stirring bar. After the resulting solution was heated at 70° C. for five hours the DMF was removed by evaporation under reduced pressure and a brown solid was obtained. This solid was ground into a fine powder and added to a solution of 200 ml. of benzene, 100 ml. of acetic anhydride and 25 ml. of pyridine contained in a 1 liter round bottomed flask equipped with a reflux condenser and a heating mantle. After the mixture had been refluxed for 5 hours the organic liquids were removed by evaporation under reduced pressure. The 4,4'-diphthalimido-2,2'-stilbenedisulfonamide, a yellow-solid was crystallized from ethanol (yield 4 grams). The infrared spectra demonstrated characteristic imide absorption bonds at 1700 and 1740 cm.$^{-1}$. The ultraviolet absorption lambda max. was 448 nm.; the fluorescence lambda max. was 435 nm.

EXAMPLE III

Preparation of 2,5-di(p-chlorophenyl)3-phthalimidofuran

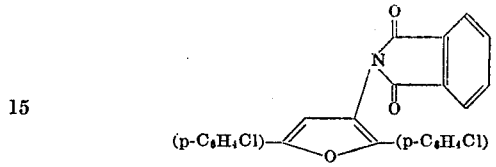

1.63 grams (.011 mole) of phthalic anhydride is added to a solution of 4.52 grams (0.01 mole) of 2,5-di(p-chlorophenyl)-3-aminofuran in 500 ml. of dimethylformamide contained in a round-bottomed flask equipped with a reflux condenser. The resulting solution is heated at 80° C. for five hours and the DMF is removed evaporation under reduced pressure producing a solid powder. This solid material is ground into a fine powder and is added to a solution of 200 ml. of benzene, 100 ml. of acetic anhydride and 25 ml. of pyridine contained in a round-bottom flask equipped with a reflux condenser and a heating mantle. After the mixture is refluxed for five hours, the organic liquids are removed by evaporation under reduced pressure. The 2,5-di(p-chlorophenyl)3-phthalimido is crystallized in good yield (approximately 4.9 grams) from ethanol.

Substantially similar results are obtained when the following compounds are substituted for 2,5-di(p-chlorophenyl): 3-aminofuran in the above reaction:

2,5-dipheny-3-aminofuran;
2,5-diphenyl-3-amino-N-methylpyrrole;
2-phenyl-5(m-methoxyphenyl)-3-aminofuran;
2-phenyl-5-(p-diethylamino)-3-aminofuran;
N-methyl-2-phenyl-5-(p-methoxy)-3-aminopyrrole;
2-(p-chlorophenyl)-5(m-sodium phenylsulfonate)-3-aminofuran; and
2-(p-sodium napthylsulfonate)-5-(p-chlorophenyl)-3-aminofuran

EXAMPLE IV

Preparation of 4-methyl-4'-phthalimidostilbene

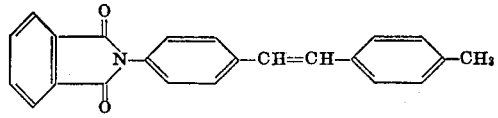

The solution obtained by adding 1.63 grams (0.01 mole) of phthalic anhydride to 100 ml. of dimethylformamide (DMF) is added with stirring to a solution of 2.09 grams (0.01 mole) of 4-amino-4'-methylstilbene in 100 ml. of DMF. The reaction is conducted in a 500 ml. actinic round-bottomed flask equipped with a reflux condenser, heating mantle and magnetic stirring bar. After the solution is heated at 80° C. for 4 hours, the DMF is removed by evaporation under reduced pressure. The resulting dry product is finely ground and added to a solution of 200 ml. of benzene, 100 ml. of acetic anhydride and 25 ml. of pyridine contained in a 1 liter round-bottomed flask equipped with a reflux condenser and a heating mantle. The mixture is allowed to reflux for 5 hours and the organic liquids are removed by evaporation under reduced pressure. The 4-methyl-4'-phthalimidostilbene is crystallized in good yield (approximately 3 grams) from benzene.

EXAMPLE V

Preparation of sodium 6-pthalimido-2-naphthalenesulfonate

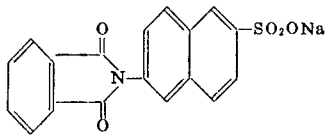

1.63 grams (0.11 mole) of phthalic anhydride is added to a solution of 2.45 grams (.01 mole) sodium 6-amino-2-naphthalene-sulfonate in 500 ml. dimethylacetamide (DMAc) and contained in a round bottomed flask equipped with a reflux condenser, heating mantle, and magnetic stirring bar. After the resulting solution is heated at 80° C. for five hours the DMAc is removed by evaporation under reduced pressure and a solid powder is obtained. This solid is ground into a fine powder and added to a solution of 2.00 ml. of benzene, 100 ml. of acetic anhydride and 25 ml. of pyridine contained in a round bottomed flask equipped with a reflux condenser and a heating mantle. After the mixture is refluxed for five hours, the organic liquids are removed by evaporation under reduced pressure. The sodium 6-phthalimido-2-naphthalenesulfonate is crystallized in good yield from ethanol.

EXAMPLE VI

Preparation of 5-phthalimidonaphthalimide.

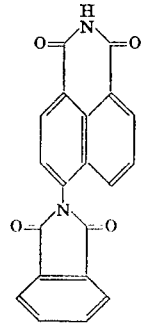

The solution obtained by adding 2.02 grams (.01 mole) of 5-aminonaphthalimide to 100 ml. of dimethylformamide (DMF) is added over a period of one hour to a stirred solution of 1.63 grams (.011 mole) of phthalic anhydride in 100 mol. of DMF. The resulting solution is heated for four hours at 80° C. and then dried by evaporation under reduced pressure. The resulting product is then added to a solution of 200 ml. of benzene, 100 ml. of acetic anhydride and 25 ml. of pyridine contained in a round-bottomed flask equipped with a reflux condenser and a heating mantle. After the mixture is refluxed for five hours, the organic liquids are removed by evaporation under reduced pressure. The 5-phthalimidonapthalimide is crystallized in good yield (approximately 2.9 grams) from benzene.

EXAMPLE VII

Preparation of 3-phenyl-7-phthalimidocoumarin

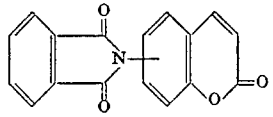

The solution obtained by adding 2.22 grams (.01 mole) of 7-amino-3-phenylcoumarin to 75 ml. of dimethylformamide (DMF) is added over a period of 1 hour to a stirred solution of 1.63 grams (.011 mole) of phthalic anhydride in 100 ml. of DMF. The resulting solution is heated for four hours at 80° C. and then dried by evaporation under reduced pressure. The resulting product is then added to a solution of 200 ml. of benzene, 100 ml. of acetic anhydride and 25 ml. of pyridine contained in a round-bottom flask equipped with a reflux condenser and a heating mantle. After the mixture is refluxed for five hours, the organic liquids are removed by evaporation under reduced pressure. The 3-phenyl-7-phthalimidocoumarin is crystallized in good yield (approximately 2.8 grams) from benzene.

Substantially similar results are obtained when the following compounds are used in place of 7-amino-3-phenyl coumarin: 7-amino-4-phenyl coumarin; 7-amino-3(sodium p-phenylsulfonate) coumarin; 7-amino-3(methoxyphenyl)coumarin; 7-amino-5-chlorocoumarin; 7-amino-3-phenyl-8-methoxycoumarin; 7-amino-3-methyl coumarin; 7-amino-3,5,8-trimethoxycoumarin; 7-amino-3, 5-diphenylcoumarin; 7 - amino-3-phenyl-5-chloromethylcoumarin; 7-amino-5-(3′,5′,7′-trioxanonyl)-3-phenylcoumarin.

Brightener tests

Table I contains data obtained by washing unsoiled, fluorescer-free cloths of the fabrics indicated in 200 ml. of washing solution in a pint jar in a laundrometer for 30 minutes at 130° F. The washing solutions were composed of 0.15% of the detergent composition as outlined below, water of 7 grain per gallon hardness, and the specified brightener compound (I or II) in the concentrations indicated. Tests were run at 4 parts per million of the brightener. The numbers are recorded in GM (Galvanek-Morrison Fluorimeter) units, with the larger numbers indicating better brightening results.

| Detergent composition: | Percent |
|---|---|
| Sodium linear dodecyl benzene sulfonate | 7.8 |
| Sodium tallow alkyl sulfate | 9.5 |
| Sodium tripolyphosphate | 49.4 |
| Sodium silicate | 5.9 |

| Detergent composition: | |
|---|---|
| $Na_2SO_4$ | 13.7 |
| Sodium carboxymethylcellulose | 0.2 |
| Nonionic suds controlling agents | 2.2 |
| Moisture | Balance |

4 p.p.m. brighteners in an aqueous solution of 0.15% of this composition is another way of reciting the use of 0.266 of the brightener in the full formulation listed above.

TABLE I

| Brightener compound | Brightener concentration, p.p.m. | GM units cotton |
|---|---|---|
| I | 4 | 68 |
| II | 4 | 45 |

The detergent (laundering and brightening) compositions of this invention are exemplified by the following examples which show different built formulations in which the mono- and diphthalimido optical brighteners can be employed. These compositions provide pH's in the range of 8.5–11.5. The invention is not limited by these examples, however, which are merely illustrative.

Example 1

| | Percent |
|---|---|
| Sodium soap of 20:80 coconut:tallow fatty acids | 35 |
| Sodium silicate | 10 |
| Tetrasodium pyrophosphate | 40 |
| Sodium chloride | 6 |
| Disodium 4,4′ - diphthalimido-2,2′-stilbenedisulfonate | 0.05 |
| Moisture | Balance |

This composition launders well and exhibits good brightening properties on cotton fabrics.

Example 2

A granular built synthetic detergent composition having the following formulation can be prepared with the brightening agents of this invention incorporated therein. The composition, in addition to performing well in its cleaning capacity, imparts effective fluorescence to fabrics cleansed in the solution.

| | Percent |
|---|---|
| Sodium linear dodecyl benzene sulfonate | 17.5 |
| Sodium tripolyphosphate | 50 |
| Sodium sulfate | 14 |
| Sodium carboxymethylcellulose | 0.5 |
| Sodium silicate | 7 |
| 4-4'-diphthalimido-2,2'-disulfonamide | 0.10 |
| Moisture | Balance |

Example 3

An excellent granular laundering and brightening composition has the following formula:

| | Percent |
|---|---|
| Dimethyldodecylphosphine oxide | 5 |
| Condensation product of 11 moles of ethylene oxide with 1 mole of coconut fatty alcohol | 10 |
| Tetrasodium methylene diphosphonate | 10 |
| Sodium tripolyphosphate | 60 |
| Sodium carboxymethyl cellulose | 0.5 |
| Sodium silicate | 10 |
| 3-phthalimido-2,5-diphenylfuran | 0.20 |
| Moisture | Balance |

A water solution containing 0.15%, 0.3% and 0.45% concentrations of the above formula provides very good cleaning and brightening results in household laundering of cotton fabrics.

Example 4

The following granular composition containing an effective chlorine bleaching agent performs very well in cleaning, whitening and brightening:

| | Percent |
|---|---|
| Sodium tallow alkyl sulfate | 7 |
| Sodium linear dodecylbenzenesulfonate | 7 |
| Sodium tripolyphosphate | 50 |
| Sodium carbonate | 10 |
| Sodium sulfate | 10 |
| Potassium dichlorocyanurate | 15 |
| 7-phthalimido-3,6-dimethylcoumarin | 0.05 |
| 7-phthalimido-4,5-dichlorocoumarin | 0.05 |
| Moisture | Balance |

Example 5

A built liquid laundering composition which brightens as it cleans and which is suitable for laundering household fabrics can have the following composition:

| | Percent |
|---|---|
| Sodium-3-dodecylaminopropionate | 6 |
| Sodium linear dodecylbenzenesulfonate | 6 |
| Potassium pyrophosphate | 20 |
| Potassium toluene sulfonate | 8 |
| Sodium silicate | 3.8 |
| Carboxymethyl hydroxyethyl cellulose | 0.3 |
| 4,4'-diphthalimido-2,2'-distilbenesulfonic acid | 0.05 |
| Water | Balance |

Example 6

Another built liquid detergent composition according to this invention has the following composition:

| | Percent |
|---|---|
| Sodium linear dodecylbenzenesulfonate | 6 |
| Dimethyldodecylamine oxide | 6 |
| Trisodium ethane-1-hydroxy-1,1-diphosphonate | 10 |
| Potassium toluene sulfonate | 8 |
| Sodium silicate (ratio $SiO_2:Na_2O$ of 2:1) | 3.8 |
| Sodium carboxymethyl cellulose | 0.3 |
| 2,5-diphenyl-3-phthalimido-N-methylpyrrole | 0.20 |
| Water | Balance |

This detergent composition is effective in laundering and brightening resin-treated cotton "wash and wear" fabrics.

Example 7

A household laundering composition can contain the following ingredients:

| | Percent |
|---|---|
| Sodium salt of $SO_3$-sulfonated tetradecene | 10 |
| Dimethyl coconut alkyl ammonio acetate | 10 |
| Trisodium ethane-hydroxy triphosphonate | 60 |
| Sodium carbonate | 10 |
| 2,5-di(p-phenylsulfonamide)-3-phthalimidofuran | 0.10 |
| Moisture | Balance |

This composition brightens as it cleans and can be usefully employed in laundering nylon fabrics.

Example 8

An effective granular detergent composition has the following formulation:

| | Percent |
|---|---|
| Sodium linear dodecylbenzenesulfonate | 7.5 |
| Sodium tallow alkyl sulfate | 2 |
| Hydrogenated marine oil fatty acid | 2.2 |
| Sodium tripolyphosphate | 40 |
| Trisodium nitrolotriacetate | 20 |
| Sodium silicate (ratio $SiO_2:Na_2O$ of 2:1) | 10 |
| Sodium sulfate | 13 |
| 4-phthalimido-4'-methoxy-2,2'-distilbenesulfonic acid | 0.50 |
| Water | Balance |

Example 9

Another effective granular detergent has the following composition:

| | Percent |
|---|---|
| Sodium linear dodecylbenzenesulfonate | 10 |
| Condensation product of 1 mole of nonyl phenol with 12 moles of ethylene oxide | 10 |
| Sodium tripolyphosphate | 10 |
| Trisodium ethane-1-hydroxy-1,1-diphosphonate | 30 |
| Trisodium nitrilotriacetate | 10 |
| Sodium silicate (ratio of $SoO_2:Na_2O$ of 2:1) | 6 |
| Trisodium phosphate | 10 |
| Sodium carboxymethyl cellulose | 0.5 |
| Sodium 4,4'-diphthalimido-2-isopropyl-2'-stilbenesulfonate | 0.1 |
| Sodium-6-phthalimido-2-naphthalensulfonate | 0.2 |
| Moisture | Balance |

Example 10

A laundering-brightening composition, especially effective on cotton fabrics at cool water temperatures, has the following composition:

| | Percent |
|---|---|
| Sodium tallow alkyl sulfate | 5 |
| 3(N,N-dimethyl-N-dodecylammonio)-2-hydroxypropane-1-sulfonate | 12 |
| Sodium salt of $SO_3$-sulfonated α-tridecene | 5 |
| Sodium tripolyphosphate | 30 |
| Trisodium nitrilotriacetate | 20 |
| Sodium silicate ($SiO_2:Na_2O=1.6:1$) | 10 |
| Sodium sulfate | 10 |
| Sodium carboxymethyl hydroxyethyl cellulose | 0.3 |
| Sodium 4,4'-di-(3-chlorophthalimido)stilbenedisulfonate | 0.1 |
| Sodium 4-methyl-4'-(3-chlorophthalimido)stilbenesulfonate | 0.1 |

Example 11

Another effective cool water built granular composition according to this invention, particularly useful with resin-treated cotton fabrics, has the following composition:

| | Percent |
|---|---|
| Sodium tallow alkyl sulfate | 5 |
| 3 (N,N - dimethyl - N-hexadecylammonio)propane-1-sulfonate | 5 |
| Dimethyldodecylphosphine oxide | 10 |
| Trisodium ethane-1-hydroxy-1,1-diphosphonate | 5 |
| Trisodium nitrilo triacetate | 10 |
| Sodium tripolyphosphate | 40 |
| Sodium silicate ($Na_2O:SiO_2 = 1:2.5$) | 10 |
| Sodium carboxymethyl cellulose | 0.3 |
| Sodium sulfate | 10 |
| 3-phthalimido-2,5-di-m-chlorophenylfuran | 0.3 |
| Moisture | Balance |

The aqueous and granular bleach compositions of this invention are exemplified by the following examples which show different formulations in which the mono- and diphthalimido optical brighteners can be employed. The invention is not, however, limited by these examples which are merely illustrative.

Example 12

An excellent aqueous bleach composition which improves the whitening of bleached textiles can have the following composition:

| | Percent |
|---|---|
| Sodium hypochlorite | 5.2 |
| Disodium - 4,4'-diphthalimido-2,2'-stilbenedisulfonate | 0.2 |
| Water | Balance |

Example 13

An aqueous bleach composition effective in improving the appearance of white and colored fabrics can have the following composition:

| | Percent |
|---|---|
| Potassium hypochlorite | 3.5 |
| 4,4'-diphthalimido-2,2'-stilbenedisulfonamide | 0.05 |
| Water | Balance |

Example 14

An aqueous bleach having advantageous bleaching and whitening can have the composition:

| | Percent |
|---|---|
| Sodium hypochlorite | 5.2 |
| 3-phenyl-7-phthalimidocoumarin | 0.05 |
| Water | Balance |

I claim:
1. A compound having the formula

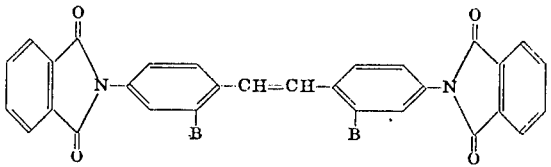

wherein each B is —$SO_2OM$ or

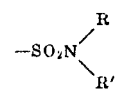

where M is hydrogen or alkali metal and each R and R' is hydrogen, alkyl of 1 to about 4 carbon atoms or part of a ring structure.

2. The compound of claim 1 wherein each M is hydrogen.

3. The compound of claim 1 wherein each M is sodium

4. The compound of claim 1 wherein each R and R' is hydrogen.

References Cited

UNITED STATES PATENTS

| 2,901,477 | 8/1959 | Siegel et al. | 260—240 |
| 3,272,830 | 9/1966 | Buell et al. | 260—240 X |
| 3,543,268 | 7/1969 | Dorlars et al. | 260—240 |

FOREIGN PATENTS

| 1,091,976 | 10/1958 | Germany | 260—240 |

OTHER REFERENCES

Kollner, Doctoral Thesis No. 67 HB 2042, Friedrich-Schiller-Univeritat of Jena, East Germany, pp. 36–40, frontispage, index relied upon.

Chemical Abstracts, vol. 67, pp. 8500–8501 (Nov. 6, 1967) (provides English Translation of Artico et al.).

Artico et al., Farmaco, Ed. Sci., vol. 22, pp. 272-286 (April 1967).

Wanag, Ber. Deut. Chem., vol. 75, pp. 719-725 (1942).

JOHN D. RANDOLPH, Primary Examiner

U.S. Cl. X.R.

117—33.5 T; 252—102, 301.2 W, 543; 260—281, 326 A, 326 N, 326 NS

PO-1050
(5/69)

UNITED STATES PATENT OFFICE
CERTIFICATE OF CORRECTION

Patent No. 3,714,151              Dated January 30, 1973

Inventor(s) Warren I. Lyness

It is certified that error appears in the above-identified patent and that said Letters Patent are hereby corrected as shown below:

Col. 1, line 50, delete "effects" and insert therefor -- affects --.

Col. 2, line 43, delete "obsorption" and insert therefor -- absorption --

Col. 3, the formula found between lines 30 to 35, the second occurrence of "2" is upside-down.

Col. 4, line 40, delete the period.

Col. 5, line 56 (in the formula) delete "$H_3N$" and insert therefor -- $H_2N$ --

Col. 8, line 23, delete "cane" and insert therefor -- can --

Col. 8, line 35, delete "acid" and insert therefor -- acids --

Col. 9, lines 14 and 15, after "pro-" (line 14) and before "portion" (line 15) insert -- pylene oxide with propylene glycol. The hydrophobic --

Col. 9, line 20, delete "polyethylene" and insert therefor -- polyoxyethylene --

Col. 13, lines 33 and 34, after "N" delete the comma.

Col. 14, line 24, after "removed" and before "evaporation" insert -- by --

UNITED STATES PATENT OFFICE
CERTIFICATE OF CORRECTION

Patent No. 3,714,151                    Dated January 30, 1973

Inventor(s) Warren I. Lyness

It is certified that error appears in the above-identified patent and that said Letters Patent are hereby corrected as shown below:

Col. 17, line 70, after the 3rd line and before the 4th line in the Example 6 composition insert therein -- tripotassium nitrilotriacetate  10 --

Col. 18, line 24, after "acid" insert therein -- suds depressant --

Col. 18, line 45, delete "SoO$_2$" and insert therefor --SiO$_2$ --

Example 16

A granular bleach formulation which improves the appearance of bleached textiles can have the following composition:

| | |
|---|---|
| 40% | sodium dichlorocyanurate |
| 10% | sodium tallow alkyl sulfate |
| 25% | potassium tripolyphosphate |
| 1% | N,N'-sodium 4-phthalimido-4'-methoxy-2-stilbene sulfonate |
| balance | sodium sulfate |

The foregoing description of the invention has been presented describing certain operable and preferred embodiments. It is not intended that the invention should be limited since variations and modifications thereof will be obvious to those skilled in the art, all of which are within the spirit and scope of this invention. --

UNITED STATES PATENT OFFICE
CERTIFICATE OF CORRECTION

Patent No. 3,714,151      Dated January 30, 1973

Inventor(s) Warren I. Lyness

It is certified that error appears in the above-identified patent and that said Letters Patent are hereby corrected as shown below:

Col. 28, line 1, delete "I claim:" and insert therefore -- What is claimed is: --

Signed and sealed this 19th day of November 1974.

(SEAL)
Attest:

McCOY M. GIBSON JR.
Attesting Officer

C. MARSHALL DANN
Commissioner of Patents